United States Patent
Christofi et al.

(10) Patent No.: US 12,238,064 B1
(45) Date of Patent: Feb. 25, 2025

(54) SOFTWARE DEFINED PERIMETER INTEGRATION FOR SOFTWARE DEFINED CELLULAR TELECOMMUNICATIONS NETWORKS

(71) Applicant: eBOS Technologies, Nicosia (CY)

(72) Inventors: Stelios Christofi, Nicosia (CY); Fanos Christofi, Nicosia (CY); Loizos Christofi, Nicosia (CY)

(73) Assignee: EBOS TECHNOLOGIES, Nicosia (CY)

( * ) Notice: Subject to any disclaimer, the term of this patent is extended or adjusted under 35 U.S.C. 154(b) by 0 days.

(21) Appl. No.: 18/238,189

(22) Filed: Aug. 25, 2023

(51) Int. Cl.
  *H04L 9/40* (2022.01)
  *H04L 41/40* (2022.01)
  *H04W 12/06* (2021.01)
  *H04W 60/00* (2009.01)

(52) U.S. Cl.
  CPC .......... *H04L 63/0209* (2013.01); *H04L 41/40* (2022.05); *H04W 12/06* (2013.01); *H04W 60/00* (2013.01)

(58) Field of Classification Search
  CPC ..... H04L 41/122; H04L 41/342; H04L 45/76; H04L 63/0209; H04W 12/06; H04W 60/00
  See application file for complete search history.

(56) References Cited

U.S. PATENT DOCUMENTS

| | | | | |
|---|---|---|---|---|
| 2019/0182213 | A1* | 6/2019 | Saavedra | H04L 63/0218 |
| 2020/0389437 | A1* | 12/2020 | Miller | H04L 63/0236 |
| 2021/0281576 | A1* | 9/2021 | Shravan | H04L 63/20 |
| 2022/0045854 | A1* | 2/2022 | Bareket | H04L 9/0891 |
| 2022/0045984 | A1* | 2/2022 | Bareket | H04L 61/255 |
| 2023/0007015 | A1* | 1/2023 | Chifor | H04L 63/0209 |
| 2024/0305668 | A1* | 9/2024 | Narayanaswamy | H04L 63/20 |

FOREIGN PATENT DOCUMENTS

| | | |
|---|---|---|
| CN | 109561066 A | 2/2022 |
| CN | 115242430 A | 10/2022 |
| KR | 20180046476 A | 5/2022 |
| WO | WO-2020068521 A1 | 4/2020 |
| WO | WO-2023279782 A1 | 1/2023 |

* cited by examiner

*Primary Examiner* — Jeong S Park
(74) *Attorney, Agent, or Firm* — CRGO Global; Steven M. Greenberg

(57) ABSTRACT

Integrating a software defined perimeter (SDP) for network applications in a 5G/6G telecommunications network includes receiving a registration request from a radio access network (RAN) component of the network into an access and mobility management function (AMF) of the network. The request routes to an SDP controller in the core network component and the SDP controller in turn transmits an authentication request over a virtual private network (VPN) coupling between a main controller and the SDP controller, on behalf of user equipment (UE) and an end user associated with the UE. Finally, responsive to the authentication, the SDP controller generates both an SDP encapsulating a set of network resources of the network supporting microservices accessible by the UE, and a secure tunnel between the UE and a gateway in a data plane of the network that moderates subsequent data flows between the UE and the microservices.

12 Claims, 3 Drawing Sheets

SOFTWARE DEFINED PERIMETER INTEGRATION FOR SOFTWARE DEFINED CELLULAR TELECOMMUNICATIONS NETWORKS

BACKGROUND OF THE INVENTION

Field of the Invention

The present invention relates to the field of network security and more particularly to security management in a software defined, advanced cellular telecommunications network.

Description of the Related Art

The software defined network (SDN) is a technology that separates the control plane management of different connected network devices, from the underlying data plane that forwards network traffic to the devices. In this regard, an SDN architecture features software-defined controllers abstracted from the underlying network hardware, while offering intent-based or policy-based management of the network as a whole. This results in a network that is better aligned with the needs of application workloads through automated provisioning, programmatic network management, pervasive application-oriented visibility, and where needed, direct integration with cloud orchestration platforms.

The separation of the control from the data plane in a network architecture remains the paramount feature of the SDN. Yet, SDN is more in that the SDN has a centralized or distributed intelligent entity that enjoys an entire view of the network, so as to make routing and switching decisions based on that view. In comparison, legacy network routers and switches only know about neighboring network equipment However, with a properly configured SDN environment, that central entity can control everything, from easily changing policies to simplifying configuration and automation across the enterprise. As can be seen, the principle of the SDN can find wide applications not just in connection with the management of a computer communications network, but also in the implementation and management of a cellular telecommunications network incorporating a computer communications network. As to the latter, the SDN forms an integral part in the current and emerging cellular telephony space such as 5G or 6G.

The SDN includes two different application programming interfaces (APIs): southbound and northbound. The southbound API is the protocol specification that enables communication between controllers and switches and other network nodes, which is with the lower-level components. The southbound API further allows the router to identify network topology, determine network flows and implement request sent to it via northbound interfaces. In contrast, the northbound API allows communication amongst the higher-level components. While a traditional network relies upon a firewall or load balancer to control data plane behavior, the SDN installs applications that use the controller and these applications communicate with the controller through its northbound interface. In the context of the SDN, these applications are known as micro-services network applications.

The architecture of the SDN of modern 5G/6G telecommunications networks through the internal flexibility of the deployment of micro-services network applications, inherently has resulted in the exponential increase in the number of devices connecting to the telecommunications network and thus an even further exponential increase in the amount of data able to be transferred between those devices on the telecommunications network. Consequently, it should be no surprise that a corresponding increase in adverse cyber-security events has been observed on such telecommunications networks. Yet, successful cyber-attacks on the telecommunications network potentially and undesirably can expose private information of an untold number of users. Thus, it is clear that increased security measures are necessary in the deployment of the modern SDN architected telecommunications network.

To compound matters, though, it is now commonplace for multiple third-party entities to interact in supporting the deployment of the SDN of an advanced telecommunications network. The weak cybersecurity maturity levels of such third-party entities provides an additional facet of attack for malicious actors including the potential for backdoor entry into the telecommunications network. Even further, the adoption of Internet of Things (IoT) devices onto advanced telecommunications networks has only further compounded the threat of loss from cyber-attack. Finally, cloud computing has been increasingly adopted in support of the operations of advanced telecommunications network, whilst Signaling System 7 (SS7) and diameter protocols often used by telecommunications network operators remain vulnerable to cyber-attacks.

BRIEF SUMMARY OF THE INVENTION

Embodiments of the present invention address technical deficiencies of the art in respect to securing the advanced telecommunications network from threat of cyber-attack. To that end, embodiments of the present invention provide for a novel and non-obvious method for the integration of a software defined perimeter (SDP) for network applications in a 5G/6G telecommunications network in order to secure access to the telecommunications network generally and to the network applications specifically. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In one embodiment of the invention, integrating an SDP for network applications in a 5G/6G telecommunications network includes receipt of a registration request from a radio access network (RAN) component of a telecommunications network, into a core access and mobility management function (AMF) of a core network component of the telecommunications network. The method additionally includes routing the request to an SDP controller in the core network component, the SDP controller managing connection initiation and connection acceptance through a control channel. In this regard, the method includes the transmission of an authentication request, over a virtual private network (VPN) coupling between a main controller and the SDP controller, on behalf of the user equipment (UE) and an end user associated with the UE.

Finally, the method includes responding to authentication by the main controller by the SDP controller generating both an SDP encapsulating a set of network resources of the telecommunications network within the SDP supporting microservices accessible by the UE, and a secure tunnel over which no other device is granted access between the UE and a gateway in a data plane of the telecommunications network. In this way, the gateway subsequently moderates subsequent data flows between the UE and the microservices. In one aspect of the embodiment, the SDP controller is a software defined virtual network function (VNF) disposed within a network slice of the telecommunications network. In another aspect of the embodiment, the secure tunnel is a northbound application programming interface (API) to the gateway. In another aspect of the embodiment, the AMF upon receiving the registration request, selects from a table of available SDP controllers, a specific SDP controller for routing the request.

In another embodiment of the invention, a data processing system is adapted for integration of an SDP for network applications in a 5G/6G telecommunications network. The system includes a host computing platform of one or more computers, each with memory and one or processing units including one or more processing cores. The system also includes an SDP integration module. The module in turn includes computer program instructions enabled while executing in the memory of at least one of the processing units of the host computing platform to receive a registration request from a RAN component of a telecommunications network, into an AMF of a core network component of the telecommunications network, to route the request to an SDP controller in the core network component, to transmit an authentication request, over a VPN coupling between a main controller and the SDP controller, on behalf of the UE and an end user associated with the UE and to respond to an authentication by the main controller by generating by the SDP controller both an SDP encapsulating a set of network resources of the telecommunications network within the SDP supporting microservices accessible by the UE, and a secure tunnel over which no other device is granted access between the UE and a gateway in a data plane of the telecommunications network. Thereafter, the gateway moderates subsequent data flows between the UE and the microservices.

In this way, the technical deficiencies of securing against cyber-attack in an SDN architected advanced telecommunications network are overcome owing both to the avoidance of signaling setup outside of the SDN controller which is resilient to cyber-attack relative to other signaling setup arrangements, and also the handoff of data flow moderation between a single UE and the gateway over a secure tunnel exclusive to the as established by the SDP controller subsequent to the authentication of the UE by the main controller.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for integrating an SDP for network applications in a 5G/6G telecommunications network. In accordance with an embodiment of the invention, UE on behalf of an end user issues a registration request tp the core network of the telecommunications network and in response, the core network routes the request to an SDP controller. The SDP controller in turn transmits an authentication request over a VPN coupling to the main controller of the core network on behalf of the UE and the end user. In response to the successful authentication of the UE and end user, the SDP controller establishes an SDP encapsulating a set of network resources of the telecommunications network within the SDP supporting microservices accessible by the UE, and a secure tunnel over which no other device is granted access between the UE and a gateway in a data plane of the telecommunications network. Thereafter, the gateway moderates subsequent data flows between the UE and the microservices. In this way, the main controller remains inaccessible to outside actors with only the SDP controller remaining exposed to the outside actors solely for the purpose of introducing the UE into the network with subsequent interactions with the UE being secured over a tunnel from the gateway to the UE. Yet, an attack upon the SDP controller in the worst case requires only the network spawning a new instance of an SDP controller thus protecting the network from cyber-attack.

Figure 1:
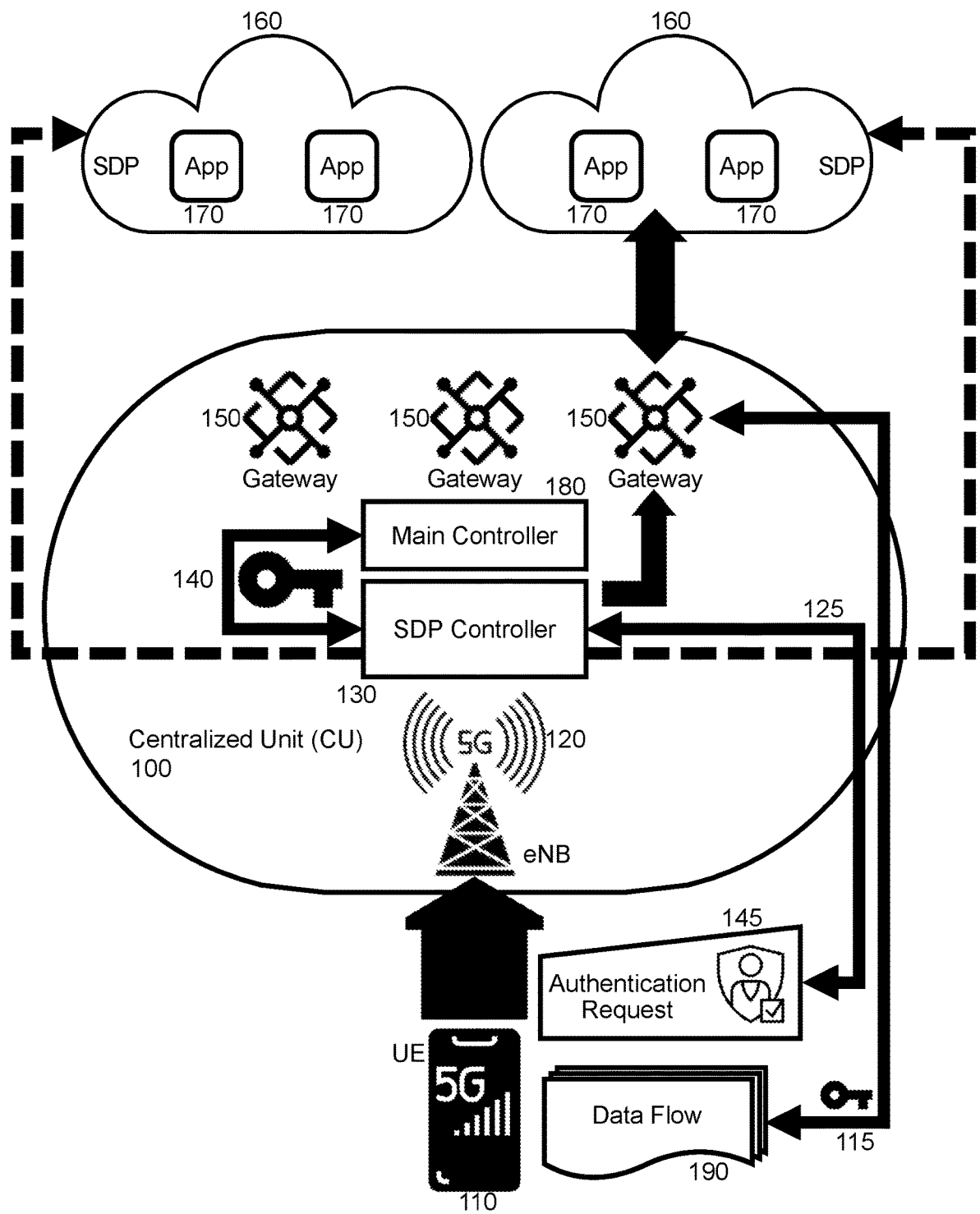
FIG. 1 is a pictorial illustration reflecting different aspects of a process of integrating an SDP for network applications in a 5G/6G telecommunications network.

In illustration of one aspect of the embodiment, FIG. 1 pictorially shows a process of integrating an SDP for network applications in a 5G/6G telecommunications network. As shown in FIG. 1, UE 110 seeks registration onto an SDN architected telecommunications network by way of a base station 120 coupled to a centralized unit 100 of the network. In the course of registration, an SDP controller 130 in the centralized unit 100 receives an authentication request 145 from UE 110. The SDP controller 130 in turn issues a counterpart of the authentication request 145 to the main controller 180 of the centralized unit 100 over a secure tunnel 140 established in the centralized unit 100 between the main controller 180 and the SDP controller 130.

Upon an indication of affirmative authentication by the main controller 180, the SDP controller 130 then creates an SDP 160 of one or more microservices 170 for access by the UE 110. The SDP controller 130 further selects a particular gateway 150 within the centralized unit 100 to manage the data flow 190 between the UE 110 and the assigned SDP 160. As such, the SDP controller 130 messages the selected gateway 150 the network endpoint of the assigned SDP 160 and that of the UE 110. The selected gateway 150 then creates a secure tunnel 115 for the exclusive use of the UE 110 in communicating with the selected gateway 150. Thereafter, the data flow 190 to the assigned SDP 160 occurs over the secure tunnel 115.

Figure 2:
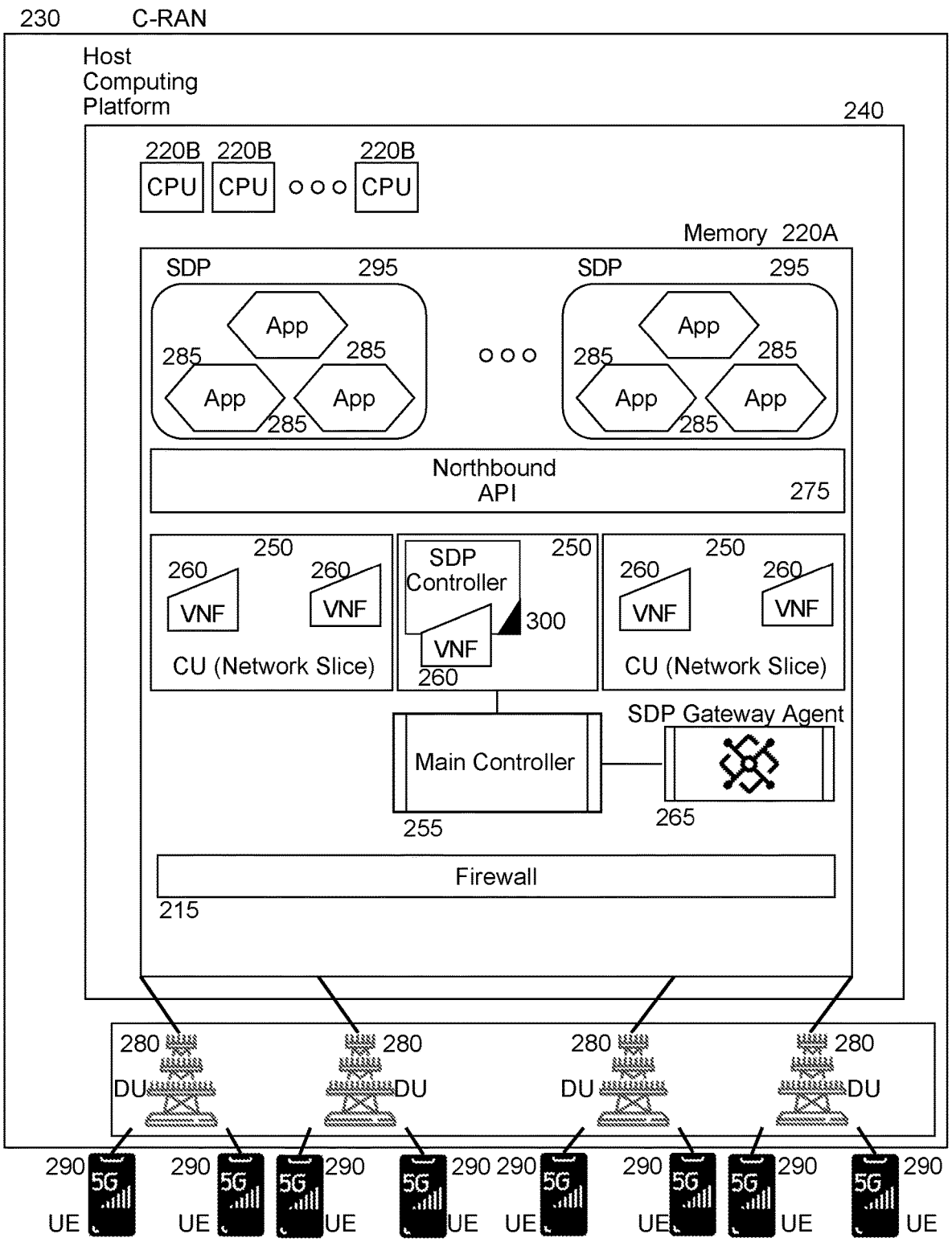
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted for integrating an SDP for network applications in a 5G/6G telecommunications network. The system includes a C-RAN 230 implemented in the control plane of an SDN. The C-RAN 230 includes a host computing platform 240 that includes one or more computers each with memory 220A and one or more processors 220B. Multiple different centralized units (CUs) 250 for respective network slices are defined in the memory 220A.

Each of the CUs 250 includes one or more infrastructure resources 260, namely virtual network functions (VNFs), accessible by different micro-services network applications 285 executing in an application plane of the SDN and accessible through northbound API 275 in order to support processing of cellular network connections with different user equipment (UE) 290 through distributed units (DUs) 280. However, a firewall 215 is inter-disposed between the DUs 280 and the CUs 250 and placed in a deny-all mode. Each request received from one of the DUs 280 from a corresponding one of the UE 290 is captured by the firewall 215 and accessed by the main controller 255 in order to determine whether or not to initiate registration of the corresponding one of the UE 290 with an associated SDP gateway agent 265 adapted to manage the data flow between the corresponding one of the UE 290 and an assigned SDP 295 incorporating different ones of the micro-services network applications 285.

Importantly, an SDP controller 300 executes as a VNF 260 in the memory 220A. The SDP controller 300 includes computer program instructions enabled during execution by the processors 220B to monitor the log of the firewall 215 and to detect in entries of the log, single packet authentication (SPA) packets received from different ones of the UE 290. In response, the SDP controller 300 directs the main controller 255 to authenticate each corresponding one of the UE 290. Responsive to the detection of the authentication of both a corresponding one of the UE 290 and an associated end user, the program instructions of the SDP controller 300 establish an SDP 295 of a set of the micro-services network applications 285 for use by the corresponding one of the UE 290 and the SDP controller 300 direct the SDP gateway agent 265 to establish a secure communications link—namely a transport layer security (TLS) conforming tunnel with the corresponding one of the UE 290.

Thereafter, the corresponding one of the UE 290 interacts with the micro-services network applications 285 of the established SDP 295 over the tunnel (through the firewall 215). In this way, a high degree of security against cyber-attack is maintained because each UE 290 once authenticated interacts only with the resources of the carefully defined SDP 295 over a tunnel established only as between the UE 290 and the assigned SDP gateway agent 265. Prior to authentication, all traffic from the UE into the network is limited to denial by the 215 and the main controller 255 and the SDP gateway agent 265 remain obscured from access behind the firewall 215. Thus, only the SDP controller 300 is exposed to the UE 290 and multiple SDP controllers 300 can be instantiated by the main controller 255 and, indeed, multiple different instances of the SDP controller 300 can be created at any one time with the main controller 255 selecting one of the instances from a table of available instances of the SDP controller 300 in order to load balance access to the different instances.

Figure 3:
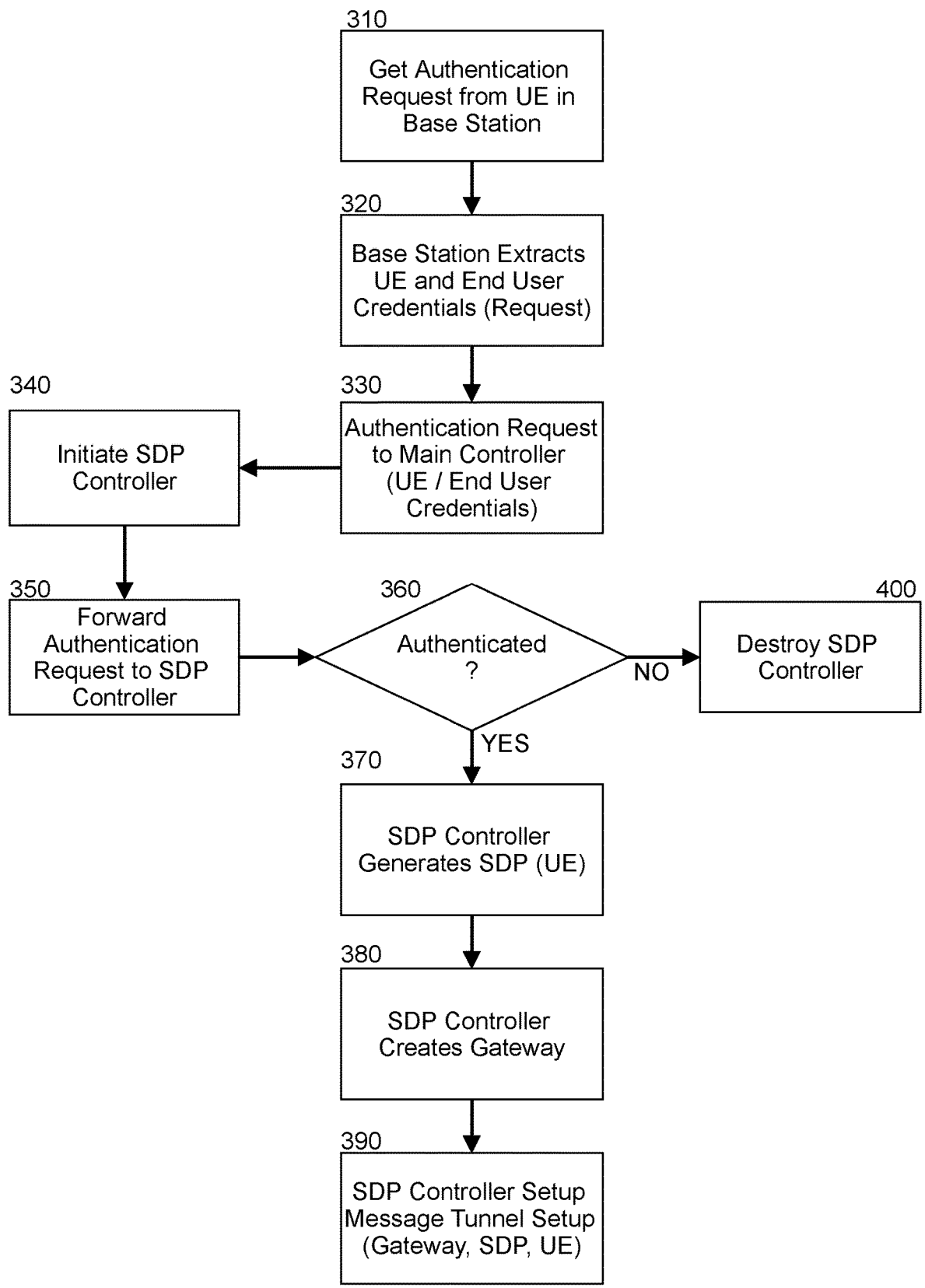

In further illustration of an exemplary operation of the module, FIG. 3 is a flow chart illustrating one of the aspects of the process of FIG. 1. Beginning in block 305, an authentication request is received from a particular UE in a base station and in block 320, the base station extracts the credentials of both the UE and an end user associated with the UE from the request. In block 330, an authentication request is then formulated according to the credentials and issued over a secure tunnel to the main controller. In block 340, the main controller initiates the SDP controller and in block 350, the main controller forwards the authentication request to the SDP controller. Then, in decision block 360, it is determined whether or not the SDP controller has authenticated the UE and end user. If not, the SDP controller is destroyed in block 400. Otherwise, the process continues in block 370.

In block 370, an SDP controller generates the SDP for the UE including different micro-services network applications required for access by the UE and determined, for instance from the original request of the UE, or based upon a characteristic set determined for the UE. In block 380, the SDP controller creates an SDP gateway agent for moderating interactivity of data flow between the UE and the SDP. Finally, in block 390, the SDP controller establishes a secure tunnel between the UE and the SDP gateway agent and the SDP controller provides the SDP gateway agent with the network endpoint of the UE for the SDP gateway agent to initiate the inter-activity of the data flow to the SDP over the tunnel.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for the integration of a software defined perimeter (SDP) for network applications in a 5G/6G telecommunications network, the method comprising:
   receiving a registration request from a radio access network (RAN) component of a telecommunications network, into a core access and mobility management function (AMF) of a core network component of the telecommunications network;
   routing the request to an SDP controller in the core network component;
   transmitting an authentication request, over a virtual private network (VPN) coupling between a main controller and the SDP controller, on behalf of the user equipment (UE) and an end user associated with the UE; and,
   responsive to an authentication by the main controller, generating by the SDP controller both an SDP encapsulating a set of network resources of the telecommunications network within the SDP supporting microservices accessible by the UE, and a secure tunnel over which no other device is granted access between the UE and a gateway in a data plane of the telecommunications network,
   wherein the gateway moderates subsequent data flows between the UE and the microservices.

2. The method of claim 1, wherein the SDP controller is a software defined virtual network function (VNF) disposed within a network slice of the telecommunications network.

3. The method of claim 1, wherein the secure tunnel is a northbound application programming interface (API) to the gateway.

4. The method of claim 1, wherein the AMF upon receiving the registration request, selects from a table of available SDP controllers, a specific SDP controller for routing the request.

5. A data processing system adapted for integration of a software defined perimeter (SDP) for network applications in a 5G/6G telecommunications network, the system comprising:
   a host computing platform comprising one or more computers, each with memory and one or processing units including one or more processing cores; and,
   an SDP integration module comprising computer program instructions enabled while executing in the memory of at least one of the processing units of the host computing platform to perform:
      receiving a registration request from a radio access network (RAN) component of a telecommunications network, into a core access and mobility management function (AMF) of a core network component of the telecommunications network;
      routing the request to an SDP controller in the core network component;
      transmitting an authentication request, over a virtual private network (VPN) coupling between a main controller and the SDP controller, on behalf of the user equipment (UE) and an end user associated with the UE; and,
      responsive to an authentication by the main controller, generating by the SDP controller both an SDP encapsulating a set of network resources of the telecommunications network within the SDP supporting microservices accessible by the UE, and a secure tunnel over which no other device is granted access between the UE and a gateway in a data plane of the telecommunications network,
      wherein the gateway moderates subsequent data flows between the UE and the microservices.

6. The system of claim 5, wherein the SDP controller is a software defined virtual network function (VNF) disposed within a network slice of the telecommunications network.

7. The system of claim 5, wherein the secure tunnel is a northbound application programming interface (API) to the gateway.

8. The system of claim 5, wherein the AMF upon receiving the registration request, selects from a table of available SDP controllers, a specific SDP controller for routing the request.

9. A computing device comprising a non-transitory computer readable storage medium having program instructions stored therein, the instructions being executable by at least one processing core of a processing unit to cause the processing unit to perform integration of a software defined perimeter (SDP) for network applications in a 5G/6G telecommunications network, by:
 receiving a registration request from a radio access network (RAN) component of a telecommunications network, into a core access and mobility management function (AMF) of a core network component of the telecommunications network;
 routing the request to an SDP controller in the core network component;
 transmitting an authentication request, over a virtual private network (VPN) coupling between a main controller and the SDP controller, on behalf of the user equipment (UE) and an end user associated with the UE; and,
 responsive to an authentication by the main controller, generating by the SDP controller both an SDP encapsulating a set of network resources of the telecommunications network within the SDP supporting microservices accessible by the UE, and a secure tunnel over which no other device is granted access between the UE and a gateway in a data plane of the telecommunications network,
 wherein the gateway moderates subsequent data flows between the UE and the microservices.

10. The device of claim 9, wherein the SDP controller is a software defined virtual network function (VNF) disposed within a network slice of the telecommunications network.

11. The device of claim 9, wherein the secure tunnel is a northbound application programming interface (API) to the gateway.

12. The device of claim 9, wherein the AMF upon receiving the registration request, selects from a table of available SDP controllers, a specific SDP controller for routing the request.

* * * * *